May 26, 1931.  H. W. LINDGREN  1,806,879
RUNWAY SWITCH AND CONTROL THEREFOR
Filed Jan. 27, 1930   5 Sheets-Sheet 1
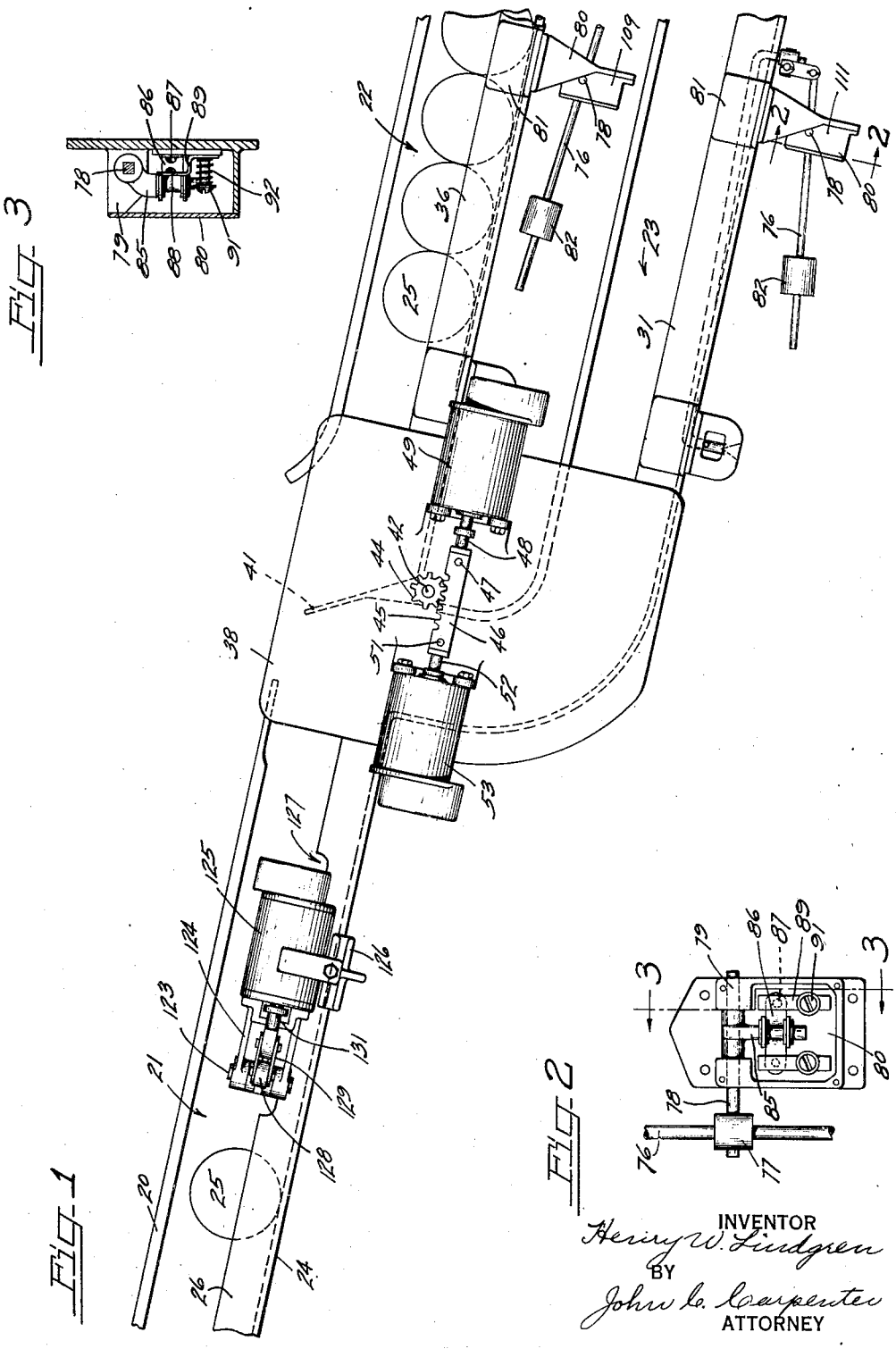

May 26, 1931.  H. W. LINDGREN  1,806,879
RUNWAY SWITCH AND CONTROL THEREFOR
Filed Jan. 27, 1930   5 Sheets-Sheet 2
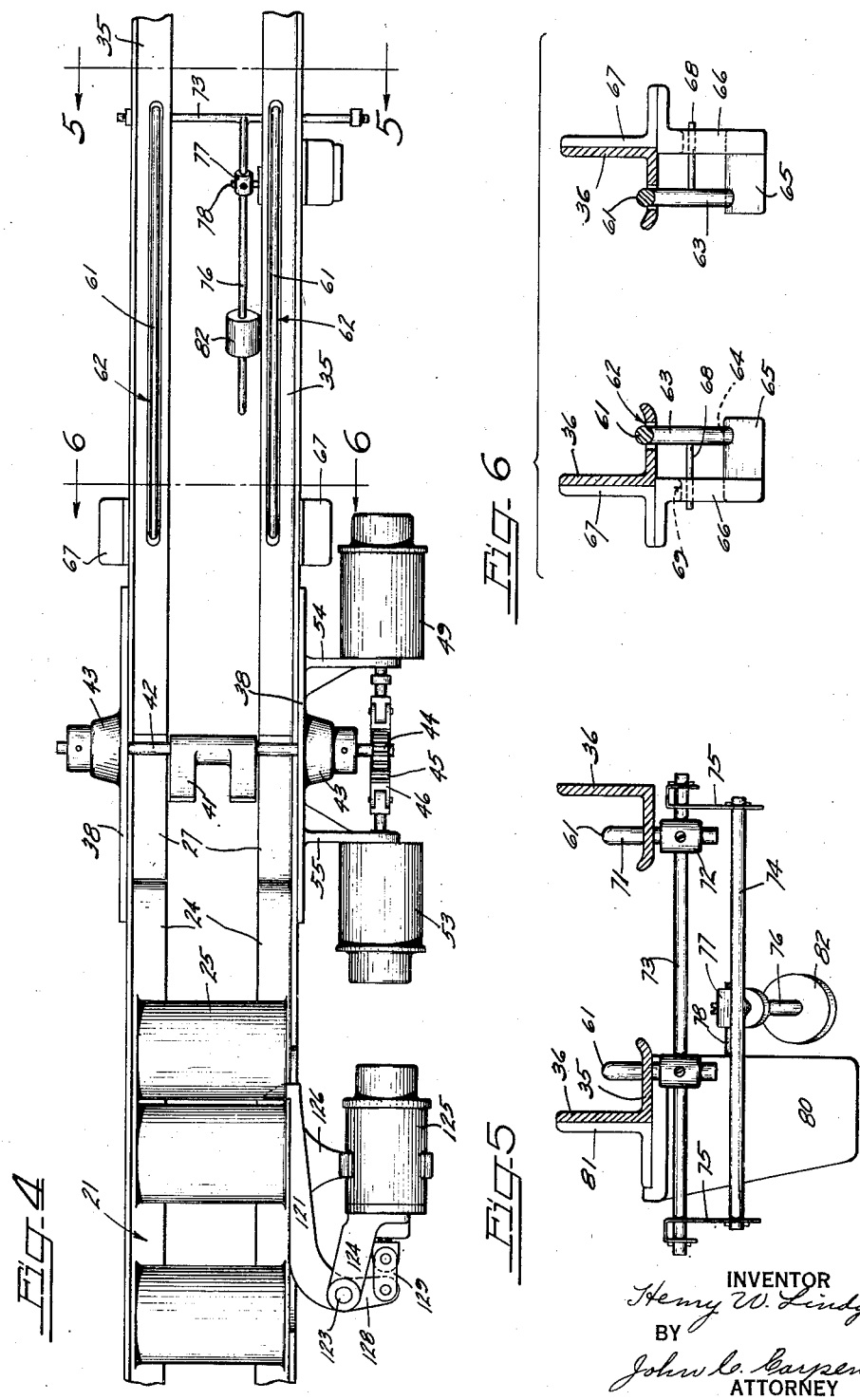

May 26, 1931. H. W. LINDGREN 1,806,879
RUNWAY SWITCH AND CONTROL THEREFOR
Filed Jan. 27, 1930 5 Sheets-Sheet 3
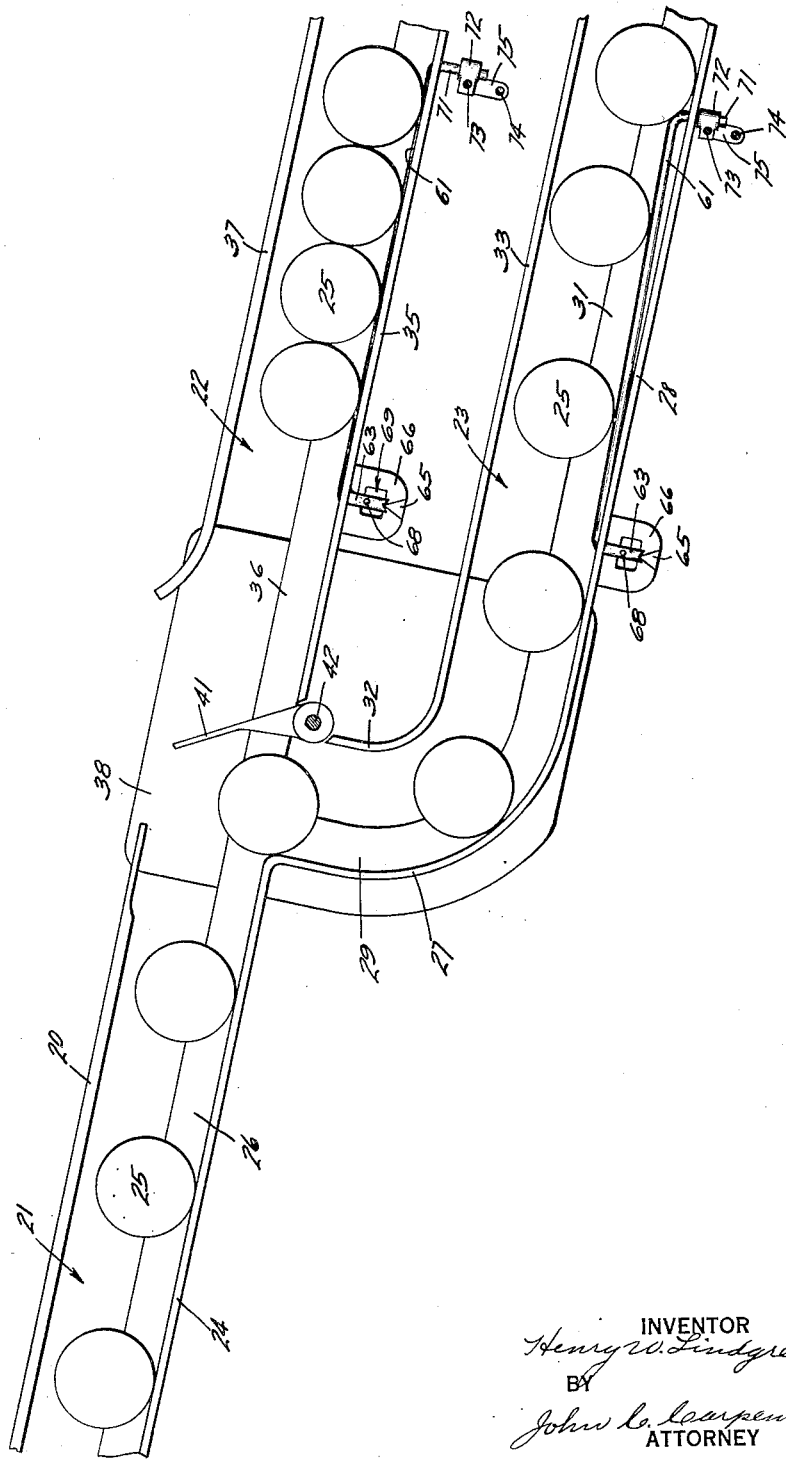
INVENTOR
Henry W. Lindgren
BY
John C. Carpenter
ATTORNEY

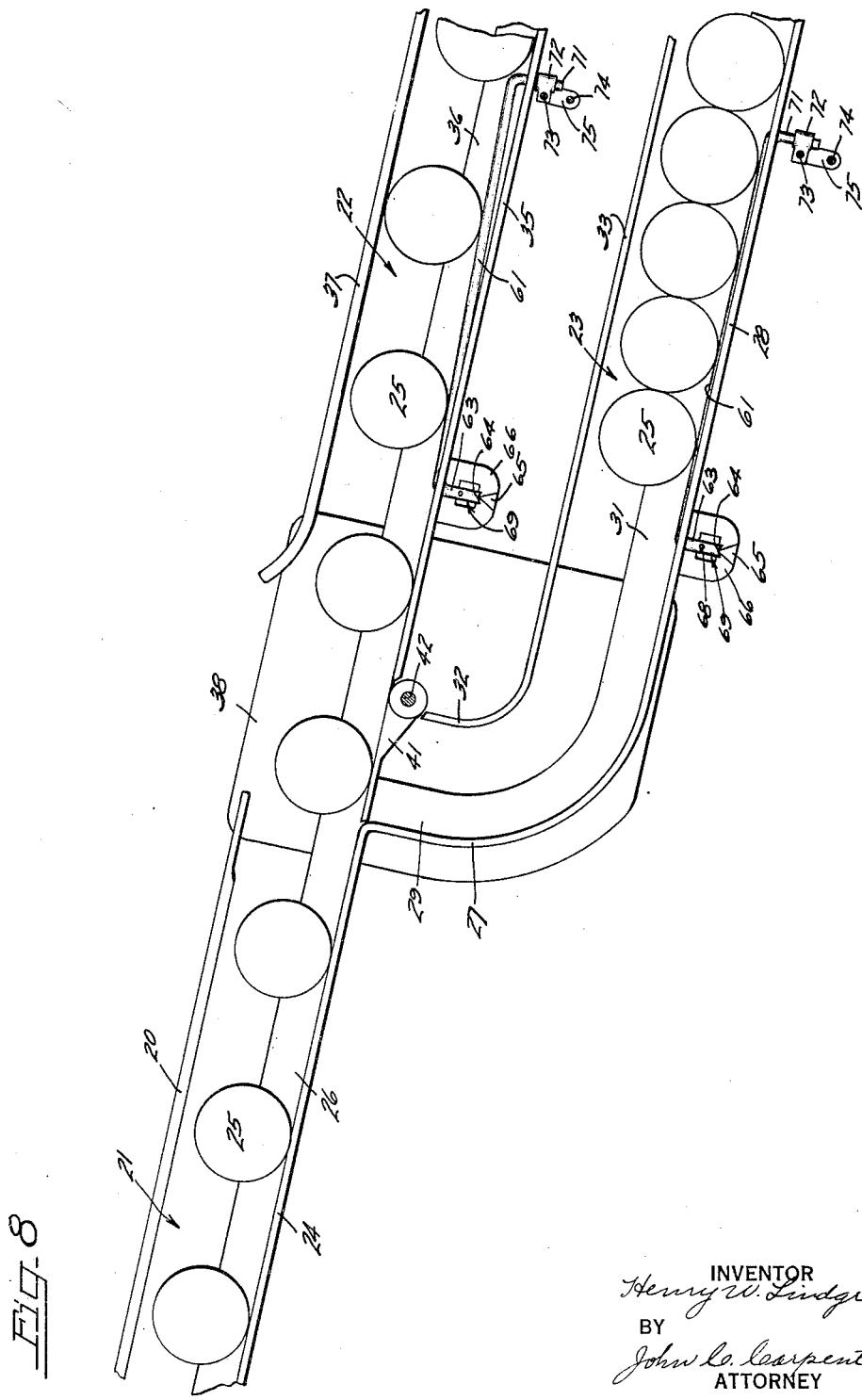

May 26, 1931.  H. W. LINDGREN  1,806,879
RUNWAY SWITCH AND CONTROL THEREFOR
Filed Jan. 27, 1930   5 Sheets-Sheet 5
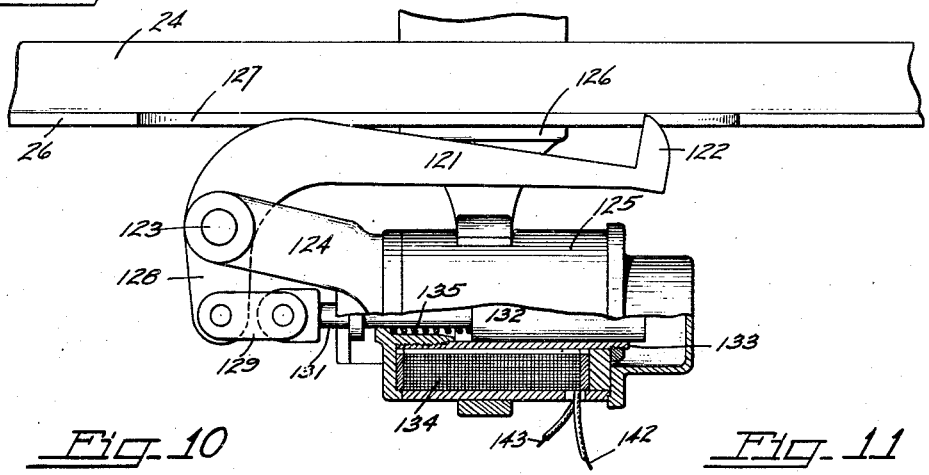
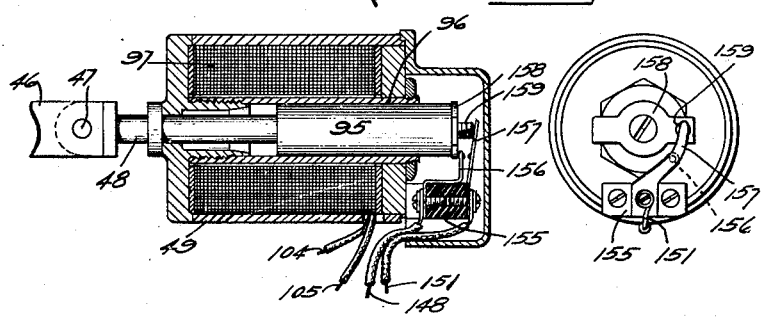
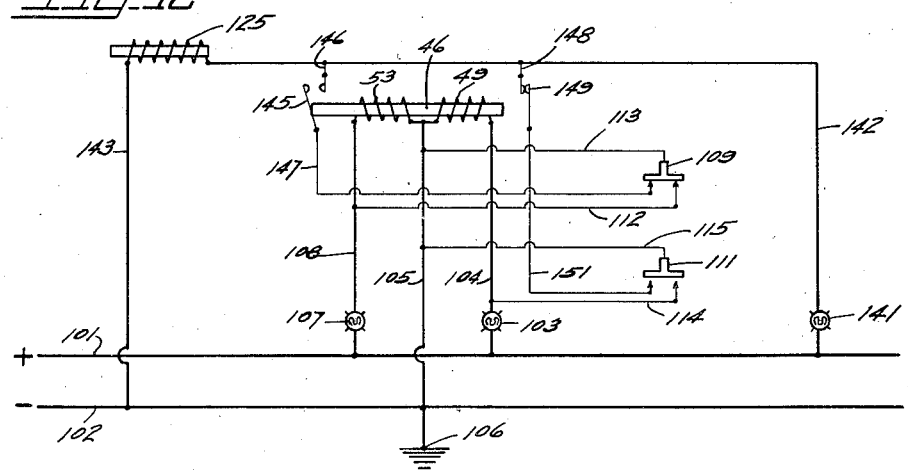
INVENTOR
Henry W. Lindgren
BY
John C. Carpenter
ATTORNEY Patented May 26, 1931

1,806,879

UNITED STATES PATENT OFFICE

HENRY W. LINDGREN, OF WAUKEGAN, ILLINOIS, ASSIGNOR TO AMERICAN CAN COMPANY, OF NEW YORK, N. Y., A CORPORATION OF NEW JERSEY

RUNWAY SWITCH AND CONTROL THEREFOR

Application filed January 27, 1930. Serial No. 423,712.

The present invention relates to a runaway switch and control therefor and has particular reference to a switch for directing rolling articles, such as cans, into different runways.

The principal object of the present invention is the provision of a runway switch which is actuated by conditions within a runway to selectively direct articles passing in the runway into different sections thereof.

An important object of the invention is the provision of a switch mechanism operating to prevent feeding of articles into a section of a runway after a predetermined number of articles have accumulated therein.

An important object of the present invention is the provision of a selective switch mechanism for a runway which operates, when an accumulation of articles takes place within a section thereof, to divert the articles into another section, the switch mechanism also providing for the temporary holding of the articles about to enter the switch during its shifting from one diverting position into another.

A further important object of the invention is the provision of a runway switch mechanism operating upon accumulation of articles within a section thereof to prevent further feeding of the articles into that section and to also prevent article feeding during the shifting of the switch whereby articles are prevented from moving onto the switch, the mechanism further operating after such switch movement to automatically restore normal runway conditions with the articles thereafter passing into another section of the runway.

An important object of the invention is the provision of an electrical control for a runway switch which is mechanically actuated by an accumulation of articles within one of the sections of the runway to shift the switch and selectively direct the articles into another section of the runway.

The invention contemplates the provision of an electrical control for a runway switch controlled by a principal electrical circuit normally holding the switch into one of two positions during which time articles freely pass into one or the other of two sections of the runway, the electrical control also embodying an auxiliary circuit normally permitting free passage of the articles into the switch, and a plurality of shunt circuits associated with the main and auxiliary circuits for simultaneously shifting the switch and preventing passage of cans thereto during its movement.

The invention further contemplates the provision of an electrical control for a runway switch controlled by a normally closed main magnet circuit and a normally closed auxiliary magnet circuit and an actuating control for the electrical control which includes shunt circuits for the main circuit and the auxiliary circuit, the shunt circuits being operable, by accumulation of articles within a section of the runway, to shift the switch and momentarily hold entrance of articles thereto, after which, the main and auxiliary circuits are automatically reestablished and normal conditions are restored to permit passing of the articles into another section of the runway.

Numerous other objects and advantages of the invention will be apparent as it is better understood from the following description, which, taken in connection with the accompanying drawings, discloses a preferred embodiment thereof.

Referring to the drawings:—

Figure 1 is a side elevation of a portion of a runway and runway switch adapted to exemplify the present invention, the view also illustrating portions of the control therefor.

Fig. 2 is an enlarged front elevation of one of the electrical switches used in the control mechanism illustrated in Fig. 1, the view being taken with the housing cover removed, being viewed substantially from the position indicated by the broken line 2—2 in Fig. 1.

Fig. 3 is a sectional view taken substantially along the line 3—3 in Fig. 2.

Fig. 4 is a plan view of the runway and associated mechanism illustrated in Fig. 1.

Fig. 5 is an enlarged transverse sectional view through one of the runway sections, taken substantially along the line 5—5 in Fig. 4.

Fig. 6 is an enlarged transverse sectional view taken substantially along the line 6—6 in Fig. 4.

Fig. 7 is a longitudinal vertical sectional view taken through the center of the runway, the view illustrating one position of the runway switch.

Fig. 8 is a view similar to Fig. 7 illustrating another position of the runway switch.

Fig. 9 is a fragmentary top plan detail of the can holding stop device associated with one section of the runway, parts being broken away and parts being illustrated in section.

Fig. 10 is a longitudinal section taken through one of the switch magnets.

Fig. 11 is an end elevation after the end cover is removed of the magnet shown in Fig. 10.

Fig. 12 is a wiring diagram of the various electrical circuits used in the present invention.

The switch mechanism and control therefor which forms the subject of the present invention may be embodied in a runway of the gravity type wherein articles, which may be cans or can bodies, roll through the runway from an inlet section into one of several outlet sections, the directing of the articles into a particular section being accomplished by the switch mechanism which is in part interposed between the inlet section and the outlet sections. A runway having one inlet section 21 and two outlet sections 22 and 23 is shown in the drawings as a preferred embodiment of the invention.

The inlet section 21 comprises spaced inclined floor rails 24 along which cans 25 roll by gravity, the cans throughout this section being retained in position by side guides 26 which may be formed integral with the floor rails. A top guide 20 positioned above the rails 24 prevents accidental displacement in the usual manner.

Each rail 24 is preferably extended downwardly at right angles and into a curved part 27 which connects with a floor rail 28 of the outlet runway 23. Side guide walls 29 which may be integral parts of the guides 26 retain the rolling cans 25 in proper position when they pass along the floor 27, the walls 29 connecting with other side walls 31 in the outlet section 23. A curved member 32 is spaced an equal distance from the floor 27 and is an integral part of an upper member 33, these members cooperating with the side walls 31 to properly direct the rolling cans 25 entering into the outlet runway 23.

Outlet runway 22 comprises floor rail members 35 over which the cans 25 roll when they are directed into this outlet section. Guide rails 36 preferably integral with the rails 35 are spaced on opposite sides of the passageway and cooperate with an upper guide plate 37 to retain the rolling cans in their path of travel through the outlet section 22. The juncture between the inlet section 21 and the two outlet sections 22 and 23 is confined between side plates 38 forming part of the supporting frame for the runway system.

A runway switch 41 (Figs. 4, 7 and 8) is located between the side plates 38 and has movement inside of and between the rails 27 and 35 being secured to a horizontal rockshaft 42 journaled in bearings 43 formed on the side plates 38. When the switch 41 is in raised position, as illustrated in Fig. 7, rolling cans 25 pass freely from the inlet runway 21 down along the curved floor members 27 and into the outlet runway 23. When the switch 41 is in lowered position, as illustrated in Fig. 8, the rolling cans 25 pass over the upper surface of the switch in moving from the floor members 24 of the inlet section 21 and are thereby transferred onto the floor members 35 of the outlet section 22.

The switch 41 is adapted to remain in one or the other of its positions until the particular outlet runway being supplied with cans from the inlet runway is unable for any reason to receive more cans. For example, a crowded condition of cans in a runway may result by the shutting down of a machine with which the runway section is connected or such a condition may result from a blocking of an outlet runway section by jammed or mutilated cans or from other cause.

Normally the cans roll freely at spaced intervals and in a given length of runway at any particular time the number of cans is small. This is entirely changed when cans accumulate and at such a time in the same length of runway are relatively a great number of cans. This added weight of the greater number of cans is utilized to control the movement of a runway switch which is automatically shifted to terminate further feeding of cans to that particular runway until the congested condition is relieved. This will be more apparent as the description proceeds.

The horizontal shaft 42 (Figs. 1 and 4) carries a pinion 44 located outside of one of the side plates 38 and meshes with rack teeth 45 formed on the upper edge of a bar 46 connected at one end by a pivot 47 to a core member 48 of a magnet 49 of the solenoid type. Bar 46 is also pivoted at 51 to a core member 52 of a magnet 53 also of the solenoid type. The two solenoids 49 and 53 are located in axial alignment, one with the other, and spaced on opposite sides of the shaft 42, solenoid 49 being supported by a bracket 54 and solenoid 53 by a similar bracket 55, both brackets being outwardly projected from one of the side plates 38.

The switch 41 is normally, although indirectly, under the magnetic influence of both solenoids 49 and 53, which are adapted to be individually energized by a suitable electrical circuit hereinafter fully described. When both solenoids 49 and 53 are energized, the magnetic influence on their respective core members 48 and 52 hold the bar 46 in a stationary and balanced condition. Movement of the switch results from a deenergizing of one of the solenoids, this being caused by abnormal runway conditions and at such a time the opposite solenoid exerting an unbalanced influence against one end only of the bar causes the same to move and through its rack and pinion connection with the shaft 42 to shift the switch 41.

For influencing the electrical current passing through the solenoid 49 or through the solenoid 53, detectors are provided one being located in each of the outlet sections 22 and 23. These detectors comprise spaced rods 61 (Figs. 4, 6 and 8) normally resting in slots 62 cut in the floor members 28 and 35 of the outlet sections. The rear end of each rod 61 is bent downwardly at 63 and terminates in a notched end 64 which rests upon a knife edge 65 supported on a bracket 66 carried by a bracket 67 secured to each of the associated side rails 36 or 31 of the particular outlet section. A pin 68 projects outwardly from each part 63 and extends through a slot 69 formed in the bracket 66, this preventing displacement of the bar 61 while holding its end 64 upon the knife edge 65.

The forward end of each bar 61 (Figs. 4, 5 and 8) is bent downwardly in a leg 71 which is adjustably clamped in a block 72 carried by a cross-shaft 73. The shaft 73 is linked with a lower parallel shaft 74 by spring clips 75 joining the two ends of the shafts 73 and 74. Each shaft 73 and 74 has pivotal movement within the clip 75, these parts constituting elements in a parallelogram system, such as is commonly used in gravity weight scales, the present construction being such a device.

The shaft 74 is formed integral with a right angled, projecting rod 76 located centrally of the shaft 74. The rod 76 is adjustably held in a block 77 pivoted on a projecting rockshaft 78 (see also Figs. 2 and 3) journaled in bearings 79 carried in an electrical switch housing 80 clamped against the bottom face of the rail 35 of the section 22 or against the rail 28 of the section 23. A bracket 81 secured to rail 36 or 31 assists in this support. The rod 76 carries a counterweight 82 adjustably positioned adjacent the outer end and this weight completes the scale construction, as previously described, and normally holds the ends of the rods 61 upwardly, as shown in the upper runway section 22 in Fig. 8 and in the lower runway section 23 in Fig. 7.

As long as the rolling cans 25 normally and freely pass along an outlet runway section, the weight of the relatively few spaced cans, passing over the rods 61 is insufficient to overcome the counterbalancing action of the weight 82 and the rods remain in raised position. In the event of abnormal runway conditions when the free passage of the cans along the runway section is interrupted the accumulating cans lodging upon the rods 61, by their combined weights, overcome the counterbalancing action of the weight 82 and the forward ends 71 of the rods are thereupon depressed into the position illustrated in the upper runway section 22, as shown in Fig. 7 or in the lower runway section 23, as shown in Fig. 8. This depressing action of the rods causes an oscillation of the shaft 78 within the electrical switch housing 80 and this action is utilized for changing conditions in the electrical currents passing into and through the solenoids 49 and 53 as will now be explained.

The electrical switch contained within each housing 80 (Figs. 2 and 3) comprises a movable arm 85 secured to the shaft 78 intermediate the bearings 79 and this arm carries a contact clip 86 provided with two contact buttons 87 which are moved, during the shaft oscillation just described, into engagement with two contact buttons 88 carried on spring clips 89 yieldingly held by screws 91 and springs 92 to a part of the housing 80.

The solenoids 49 and 53 are of identical construction and a brief description of the solenoid 49 will suffice for both. The core 48 of the solenoid (Figs. 10 and 11) is enlarged as at 95 and this enlargement slides freely within a sleeve 96 surrounded by a magnetic field winding 97 of the solenoid. As long as electrical current is flowing through this winding the solenoid is energized and there is a tendency for the core part 95 to be drawn inwardly toward a more central position within the solenoid. Fig. 10 illustrates the position of the core part as being in an outward position relative to the windings 97 and it is from this position that the sliding parts of the solenoid will move provided the magnetic influence of the solenoid is unrestricted.

The operation of an electrical circuit or circuits controlling the automatic operation of the switch 41 will now be given. Such a circuit or circuits comprise main lead wires 101 and 102 (Fig. 12) leading from and back to any suitable source of electrical energy. During the normal operation of the runway, current passes from the wire 101 through a lamp 103 along a wire 104 into the windings of the solenoid 49, thence along a wire 105 and to the wire 102. This wire may be grounded as at 106 to the frame of the machine, the frame parts in that event constituting conductors for one side of the circuit in the usual and preferred manner.

At the same time, current flows from the wire 101 through a lamp 107 along a wire 108 into the windings of the solenoid 53 and thence by the wire 105 back to the wire 102. It will be evident that there are two main magnet circuits and during the normal operation of the device both solenoids 49 and 53 remain energized and the sliding bar 46 remains in a stationary balanced position regardless of its actual position toward the left or the right.

For controlling these main circuits there are provided two electrical switches of the type described in connection with Figs. 2 and 3 by which, when their contacts 87 and 88 are brought together, a connection is made in an electrical circuit passing through that particular switch. One such type of switch is located in the runway section 22 (Fig. 1) and is designated by the numeral 109 and the same type of switch is located in the runway section 23 and is designated by the numeral 111.

Provision is made for shunting the electrical current flowing into one or the other of the solenoids 49 or 53 by respectively closing the contacts in the switches 111 or 109. A shunt circuit for the switch 109 and the solenoid 53 (Fig. 12) may be carried by a wire 112 connected to the wire 108 and passing into one of the contacts in the switch 109, the opposite contact in the switch being connected by a wire 113 leading back to the wire 105.

When cans 25 have accumulated within the runway section 22 sufficient to close the contact in the switch 109, electrical current flows from the wire 101, through the lamp 107, wire 108, wire 112, switch 109, wire 113, wire 105 back to the wire 102. This provides a shunt circuit which is not restricted by high resistances such as are met in the windings of the solenoid 53 and this shunt circuit accordingly cuts out the main electrical circuit passing through that solenoid with the result that it is deenergized.

Immediately the balanced condition of the electrical and magnetic forces acting on the core members connected with the bar 46 is disturbed and the influence of the energized solenoid 49, not being counterbalanced by the solenoid 53, shifts the bar 46 toward the left, as illustrated in Fig. 12. Movement of the bar 46 toward the left, as best illustrated in Fig. 1, causes the switch 41 to move upwardly wherein passing of cans into the runway section 22 terminates and the cans thereafter pass into the runway section 23 (see also Fig. 7).

A similar action takes place when there is an accumulation of cans within the runway section 23. At such a time, the switch 111 is closed and a shunt circuit is established which passes from the wire 101, through the lamp 103, wire 104, along a wire 114, through the switch 111, along a wire 115 back by way of the wire 105 to the wire 102. This shunt circuit does not include any high resistances such as are encountered in the windings of the solenoid 49 and the main current flowing through solenoid 49 is interrupted and it is thereupon deenergized.

The balanced condition existing when both solenoids are energized is accordingly disturbed and the bar 46 is moved toward the right, as viewed in Figs. 1 and 12, the switch 41 assuming a more horizontal position wherein further passage of cans into the runway section 23 is prevented (see also Fig. 8).

It is highly important that the cans passing from the inlet runway section 21 toward the switch 41 are momentarily held against movement until the switch has had time to complete its shifting movement from one position to the other. If such a provision were not made, cans passing onto the upper surface of the switch or passing beneath the switch during its movement might be crushed and distorted.

As illustrated in Figs. 4 and 9, a stop finger 121 is provided having a can engaging extremity 122 and is pivoted at 123 on a bracket 124 secured to the frame of a magnet 125 of the solenoid type which is carried by a bracket 126 supported by the frame of the inlet section 21. The finger 121 is normally held in the position illustrated in Fig. 9 where it is adjacent to and outside of one side guide rail 26 of the runway section 21, a slot 127 being cut in the rail 26 at this position. The finger 121 extends beyond the pivot 123 in a short arm 128 which is pivotally connected by a link 129 to one end of a core 131 of the solenoid 125.

The core 131 is enlarged at its inner end 132 and has free sliding movement within a sleeve 133 surrounded by a winding 134 of the solenoid 125. A spring 135 is interposed between the end 132 and one end of the casing of the solenoid 125 and exerts a pressure against the core 131 tending to slide it toward the right, as illustrated in Fig. 9. The action of this spring 135 is normally overcome by the magnetic influence of the solenoid 125 when it is energized, at which time the end 132 of the core is held inwardly (Fig. 9) and the can engaging end 122 of the finger 121 is out of the path of travel of the rolling cans 25 passing along the runway section 21.

When this magnetic influence on the core part 132 is broken by an interruption of the electrical current passing through the windings 134, the spring 135 forces the core 131 toward the right moving the finger 121 and projecting its extremity into engagement with a can 25, as illustrated in Fig. 4. When in this position, cans are prevented from discharging from the end of section 21 onto or beneath the switch 41. The control of the electrical circuit passing through the solenoid 125 will now be described and reference should again be had to Fig. 12.

An electrical current is supplied to the solenoid 125 by means of an auxiliary circuit passing from the wire 101 (Fig. 12) through a lamp 141, a wire 142 and into the windings of the solenoid 125, thence along a wire 143 to the lead wire 102. While this auxiliary current is maintained, the solenoid 125 is energized and the finger 122 is held in the position illustrated in Fig. 9 to permit free passage of the cans through the runway section 21.

As soon as the switch 109 in runway section 22 is closed by an accumulation of cans therein, as previously described, an auxiliary shunt circuit is established which diverts the current normally flowing in the auxiliary circuit through the solenoid 125 since this shunt circuit does not have any high resistance such as that presented by the windings 134 of the solenoid.

This auxiliary shunt circuit includes a circuit make-and-break instrumentality 145 (Fig. 12) located adjacent the left end of the sliding core of the solenoid 53, the bar 46 at the time the shunt circuit is first closed by operation of the switch 109 being toward the right. With the switch 109 closed, current flows from the wire 101 through the lamp 141, wire 142, a wire 146 through the make-and-break instrumentality 145, along a wire 147 through the switch 109, thence along the wire 113 and wire 105 back to the line 102. With the solenoid 125 deenergized by this shunting action, the finger 121 held by the spring 135 prevents passage of the cans through the inlet runway 21 while the runway switch 41 moves into its new position.

The moving bar 46 as it approaches the end of its stroke strikes against the make-and-break instrumentality 145 and separates its contacts, whereupon the auxiliary shunt circuit is interrupted at this point, this break being clearly shown in Fig. 12. The auxiliary circuit through the solenoid is immediately established and the extremity 122 of the finger 121 is withdrawn from can engaging position and the cans are thereafter permitted to roll toward the runway switch 41.

A similar provision is made for momentarily holding back the cans upon accumulation within the runway section 23, an auxiliary shunt circuit being established to deenergize the magnet 125 and permit movement of the finger 121 into can engaging position during the shifting of the runway switch 41.

The closing of the switch 111 (Fig. 12) establishes such an auxiliary shunt circuit, electrical current flowing from the wire 101 through the lamp 141, wire 142, a wire 148 and through a make-and-break device 149 (located to the right of solenoid 49), along a wire 151 through the switch 111 thence along wire 115 and wire 105 back to the wire 102. It will be understood that the bar 46 at the time this circuit is established is in its left-hand position, indicated in Fig. 12, and the following movement of the bar is toward the right.

As the bar 46 approaches the end of its stroke, its right end engages the make-and-break instrumentality 149 and separates its contact points breaking the current at this place. The auxiliary current is thereupon immediately re-established through the solenoid 125 and the rolling cans 25 in the runway section 21 continue their normal movement.

The mechanical features of the respective make-and-break instrumentalities 145 and 149 are identical in construction and form a part of the solenoids 53 and 49. A description of the details of the make-and-break instrumentality 145 as associated with the solenoid 49 and as illustrated in Figs. 10 and 11, will be given as exemplification of both instrumentalities.

The casing of the solenoid 49 supports an insulated block 155 which carries a spring contact blade 156 connected to the wire 148 and a similar contact blade 157 connected to the wire 151. The enlarged end 95 of the core 48 carries a projecting plate 158 which on one side carries a screw 159. When the core 48 of the solenoid 49 is in its inward position (toward the left in Fig. 10) the natural spring of the blades 157 and 156 causes the same to contact one another and close the circuit passing through the wires 148 and 151.

When the core 48 is shifted toward the right as the result of a deenergizing of the solenoid 49, the screw 159 presses against the free end of the blade 157 and the latter is bent out of contact with the blade 156, this position being illustrated in Fig. 10. This separation of the contact plates 156 and 157 takes place only after the sliding core 48 and its enlarged head portion 95 practically reaches its limit of movement and, therefore, the shunt circuit is not broken until the runway switch 41 completes its movement. This provides an automatic operation and an accurate synchronism of all of the elements of the runway switch and its control.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can runway switch mechanism the combination of an inlet runway section, a plurality of outlet runways sections, a runway switch interposed between said inlet and said outlet sections for selectively directing cans from the former into one of the latter, and means partially located within each of said outlet sections and operable by an accumulation of cans in that section to actuate said switch and thereby divert the cans into the other of said outlet sections.

2. In a can runway switch mechanism the combination of an inlet runway section, a plurality of outlet runway sections, a runway switch interposed between said inlet and said outlet sections for selectively directing cans from the former into one of the latter, means partially located within each of said outlet sections and operable by an accumulation of cans in that section to actuate said switch and thereby divert the cans into the other of said outlet sections, and a stop device for preventing discharge of the cans from said inlet section into said switch during the actuation thereof.

3. In a can runway switch mechanism the combination of an inlet runway section, a plurality of outlet runway sections, a runway switch interposed between said inlet and said outlet sections for selectively directing cans from the former into one of the latter, and an electrical control for actuating said switch to divert cans into that outlet section which is in condition to receive them.

4. In a can runway switch mechanism the combination of an inlet runway section, a plurality of outlet runway sections, a runway switch interposed between said inlet and said outlet sections for selectively directing cans from the former into one of the latter, and means operating upon accumulation of cans within any of said outlet sections for electrically and mechanically shifting said switch while preventing entrance of cans thereto from said inlet section.

5. In a can runway switch mechanism the combination of an inlet runway section, a plurality of outlet runway sections, a runway switch interposed between said inlet and said outlet sections for selectively directing cans from the former into one of the latter, means operating upon accumulation of cans within any of said outlet sections for electrically and mechanically shifting said switch while preventing entrance of cans thereto from said inlet section, and means for restoring normal can passage conditions in said inlet section to permit entrance of cans into said switch following its shifting movement.

6. In a can runway switch mechanism the combination of an inlet runway section, a plurality of outlet runway sections, a runway switch interposed between said inlet and said outlet sections for selectively directing cans from the former into one of the latter, and an electrical control including magnets associated with said runway switch and connected in a normally closed main electrical circuit which normally holds said switch in one of its directing positions, said electrical control also including electrical switches, a single switch being located in each outlet section and being connected in an electrical shunt circuit associated with said main circuit whereby closing of any electrical switch by an accumulation of cans in its runway section diverts the electrical energy passing through one of said runway switch magnets deenergizing the same and thereby permitting shifting of said runway switch to direct the cans into another of said outlet sections.

7. In a can runway switch mechanism the combination of an inlet runway section, a plurality of outlet runway sections, a runway switch interposed between said inlet and said outlet sections for selectively directing cans from the former into one of the latter, an electrical control including magnets associated with said runway switch and connected in normally closed main electrical circuits which normally hold said switch in one of its directing positions, and an electrical stop device for holding the cans in said inlet section during movement of said runway switch, said stop device including a stop finger and a finger magnet connected in a normally closed auxiliary electrical circuit which normally holds said stop finger out of engagement with the passing cans in said inlet runway, said electrical control also including electrical switches, a single switch being located in each outlet section and being connected both in an electrical shunt circuit associated with one of said main circuits and in one of a pair of auxiliary shunt circuits associated with said auxiliary circuit whereby closing of any electrical switch by an accumulation of cans in its runway establishes both the shunt and the auxiliary shunt circuits connected therewith respectively deenergizing one of said runway switch magnets and said finger magnet to simultaneously permit a shifting of said runway switch and an actuation of said stop finger.

8. In a can runway switch mechanism the combination of an inlet runway section, a plurality of outlet runway sections, a runway switch interposed between said inlet and said outlet sections for selectively directing cans from the former into one of the latter, an electrical control including magnets associated with said runway switch and connected in normally closed main electrical circuits which normally hold said switch in one of its directing positions, said electrical control also including electrical switches, a single switch being located in each outlet section and being connected in an electrical shunt circuit associated with one of said main circuits, an electrical stop device for holding the cans in said inlet section during movement of said runway switch, said stop device including a stop finger and a finger magnet connected with a normally closed auxiliary electrical circuit which normally holds said stop finger out of engagement with the passing cans in said inlet runway, said electrical stop device also including circuit make-and-break instrumentalities connected in auxiliary shunt circuits one circuit being associated with each of said electrical switches whereby closing of any electrical switch by an accumulation of cans in its runway establishes both the shunt and the auxiliary shunt circuits connected therewith thereby respectively deenergizing one of said runway switch magnets and said finger magnet to simultaneously permit a shifting of said runway switch and said stop finger, and means for automatically restoring said stop finger to normal can non-engaging position following each shifting of said runway switch.

HENRY W. LINDGREN.